United States Patent
Bartenwerfer et al.

(10) Patent No.: US 9,685,069 B2
(45) Date of Patent: Jun. 20, 2017

(54) DEVICE FOR EMERGENCY SIGNALING FROM A VEHICLE, SYSTEM FOR EMERGENCY SIGNALING AND METHOD OF OPERATION

(71) Applicant: GDV GESAMTVERBAND DER DEUTSCHEN VERSICHERUNGSWIRTSCHAFT E.V., Berlin (DE)

(72) Inventors: Jens Bartenwerfer, Hohen Neuendorf (DE); Fred Chiachiarella, Kremmen (DE); Jürgen Redlich, Berlin (DE); Walter Jenny, Ehningen (DE)

(73) Assignee: GDV GESAMTVERBAND DER DEUTSCHEN VERSICHERUNGSWIRTSCHAFT E.V., Berlin (DE)

( * ) Notice: Subject to any disclaimer, the term of this patent is extended or adjusted under 35 U.S.C. 154(b) by 0 days.

(21) Appl. No.: 14/654,287

(22) PCT Filed: Dec. 20, 2013

(86) PCT No.: PCT/DE2013/100437
§ 371 (c)(1),
(2) Date: Jun. 19, 2015

(87) PCT Pub. No.: WO2014/094743
PCT Pub. Date: Jun. 26, 2014

(65) Prior Publication Data
US 2015/0356863 A1  Dec. 10, 2015

(30) Foreign Application Priority Data
Dec. 21, 2012  (DE) ........................ 10 2012 113 015

(51) Int. Cl.
*B60Q 1/00*   (2006.01)
*G08B 25/10*  (2006.01)
(Continued)

(52) U.S. Cl.
CPC .......... *G08B 25/10* (2013.01); *G08B 25/009* (2013.01); *G08B 25/016* (2013.01);
(Continued)

(58) Field of Classification Search
CPC ........................ G08B 25/10; B60R 2021/0027
(Continued)

(56) References Cited

U.S. PATENT DOCUMENTS

| 7,289,786 B2* | 10/2007 | Krasner | G08B 25/016 340/436 |
| 8,417,210 B2* | 4/2013 | Tomer | H04M 11/04 340/293 |

(Continued)

FOREIGN PATENT DOCUMENTS

| CN | 202 424 846 U | 9/2012 |
| EP | 0 860 908 A1 | 8/1998 |

(Continued)

*Primary Examiner* — Toan N Pham
(74) *Attorney, Agent, or Firm* — Leason Ellis LLP

(57) ABSTRACT

The invention describes a device for emergency signaling from a vehicle, having: a housing; a detection device, which is arranged in the housing and which is suitable for recording measurement information concerning an emergency vehicle state from one or more sensor arrangements, which are formed in a housing and/or externally; a data communication management, which is arranged in the housing and configured for emitting data signals concerning an emergency message via a data interface, wherein the emergency message comprises the electronic measurement information at least partially and/or electronic vehicle status information derived therefrom; and a plug-in device, which is arranged on the housing and has a plug connector for plugging into a motor vehicle socket. The invention further relates to a method for operating the device.

14 Claims, 4 Drawing Sheets

Figure 1:
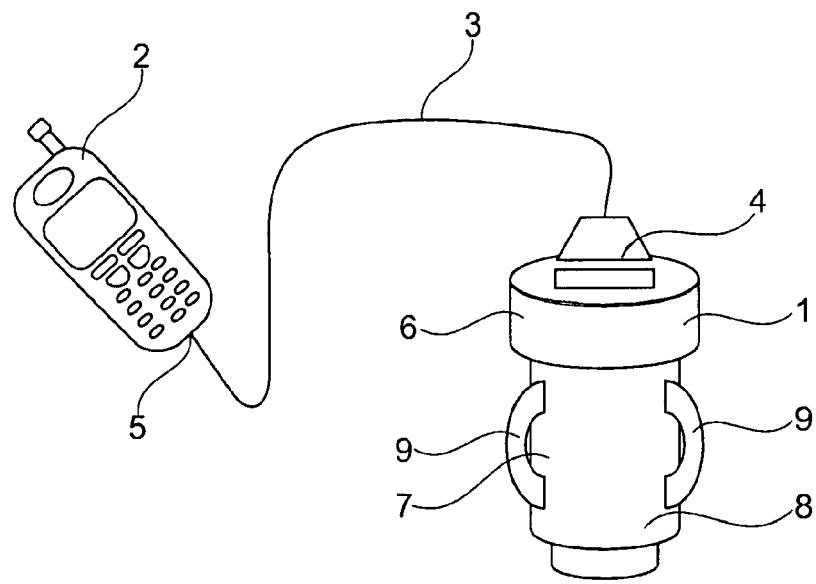

(51) Int. Cl.
  *G08B 25/00* (2006.01)
  *G08B 25/01* (2006.01)
  *G08B 29/18* (2006.01)
  *B60R 21/00* (2006.01)
  *B60R 21/01* (2006.01)

(52) U.S. Cl.
  CPC .... *G08B 29/181* (2013.01); *B60R 2021/0027* (2013.01); *B60R 2021/01013* (2013.01)

(58) Field of Classification Search
  USPC ........... 340/436, 426.18, 426.2, 517, 539.11, 340/693.5, 3.43, 6.1, 293, 904
  See application file for complete search history.

(56) References Cited

U.S. PATENT DOCUMENTS

| | | | |
|---|---|---|---|
| 8,803,677 B1* | 8/2014 | Miller | G08B 21/14 340/438 |
| 2005/0151655 A1 | 7/2005 | Hamrick | |
| 2008/0252444 A1 | 10/2008 | Batot | |
| 2010/0210237 A1 | 8/2010 | Tomer | |
| 2010/0286862 A1 | 11/2010 | Fox | |
| 2012/0197462 A1 | 8/2012 | Sakai | |
| 2015/0105967 A1* | 4/2015 | Skipp | G07C 5/008 701/31.4 |

FOREIGN PATENT DOCUMENTS

| | | |
|---|---|---|
| WO | WO 2010/129939 A1 | 11/2010 |
| WO | WO 2011/143191 A1 | 11/2011 |

* cited by examiner

DEVICE FOR EMERGENCY SIGNALING FROM A VEHICLE, SYSTEM FOR EMERGENCY SIGNALING AND METHOD OF OPERATION

CROSS-REFERENCE TO RELATED APPLICATIONS

This application is a U.S. National Stage Application under 35 U.S.C. §371 of International Patent Application No. PCT/DE2013/100437, filed Dec. 12, 2013, which claims priority to German Patent Application No. 10 2012 113 015.9, filed Dec. 21, 2012, the contents of each of which are incorporated by reference in their entireties.

The disclosure relates to a device for emergency signalling from a vehicle, a system for emergency signalling as well as a method for its operation.

BACKGROUND

Emergency signalling in the event of a vehicle collision is used, in particular, to automatically communicate the information on the collision of the vehicle to competent bodies, in particular to an emergency service centre or a rescue service. In this context, the document DE 10 2009 033 560 B4 discloses a process where the emergency message is sent from a mobile device once acceleration and speed data has been recorded in the mobile device and evaluated. Further, the document DE 10 2007 024 177 A1 discloses a process for detecting an emergency situation and for issuing an emergency call by means of a mobile communications device. Similarly, the document US 2005/0208925 A1 relates to an automatic emergency message which is sent from a mobile telephone.

Apart from using a mobile telephone installed in the vehicle, for detecting an emergency situation and for sending an emergency message in the event of a collision, it has been proposed to retrofit permanently installed suitable devices in motor vehicles for this purpose. Such retrofit modules normally comprise acceleration sensors for measuring vibrations on the vehicle. In case threshold values are exceeded, the retrofit module initiates a radio link for the communication of accident data. A transmission of data is carried out via the radio link without having to establish a voice communication to the emergency call centre.

From the document TW 1271336 B a speed measuring device for a vehicle is known, which can receive and process GPS signals and which on this basis determines speed signals. The voltage supply to the speed measuring means can be effected by connecting it via a connecting cable to a cigarette lighter in the vehicle.

The document DE 19 546 700 A1 discloses a device for indicating a pollutant content inside a motor vehicle, wherein an indicating device is provided in the interior via which values measured by at least one sensor and evaluated by a measuring device are indicated. This device also can be connected via a cable connection to the cigarette lighter of the motor vehicle for supplying it with voltage.

A process and a device for securing a vehicle are disclosed in the document EP 1 950 108 A1. A wireless sensor is provided for this purpose. This may be plugged into a cigarette lighter of the motor vehicle and sends signals via a wireless connection to a loudspeaker serving as a siren.

The document DE 10 240 830 B3 discloses a device for sending an emergency call. The device has a sensor which generates a sensor signal in the event of a vehicle collision. This sensor signal is then used to activate the transmitter of the device in order to issue an emergency call. The emergency call is transmitted together with position data of the device. The device has a holder for the transmitter, wherein at least one sensor is arranged in the holder for generating a sensor signal.

In the document DE 29 911 588 U1 a medicine cabinet for a private car is described which includes an integrated emergency call set. The medicine cabinet consists of a plastic housing or box with an emergency call button and a digital telephone, an antenna, a battery compartment and an additional connection for corded operation.

Furthermore, the document DE 29 924 325 U1 discloses a construction kit for mounting in a vehicle, intended for radio transmission of an already saved information set, with a first single-casing construction unit comprising a first antenna together with an evaluation unit detecting the geographic location, which construction unit has an additional local storage unit for this local value and a second construction unit comprising at least one activation unit for activating the information set.

Furthermore, a device for making an emergency call in a vehicle is known from the document FR 2891687.

SUMMARY

It is an object of the invention to propose new technologies for emergency signalling from a vehicle, which allow for a flexible use of the device, and which in particular support easy and low-cost assembly and disassembly to and from the vehicle.

The object is solved by a device for emergency signalling from a vehicle according to independent claim 1. Furthermore, a method for operating a device for emergency signalling from a vehicle is provided according to independent claim 10. Further embodiments are subject matter of dependent claims.

According to one aspect, a device for emergency signalling in the event of a vehicle collision or another accident-based situation is provided, which comprises a housing and a detection device arranged in the housing. The detection device is configured to detect electronic measurement information relating to an emergency situation of the vehicle, for example as a result of a collision, or as a result of vibrations detected from other causes, from one or more sensor devices formed in the housing and/or externally. As such, provision may be made for example, for a sensor device for detecting acceleration and/or speed data to be arranged in the housing of the device itself. Additionally or alternatively, provision may be made for evaluating one or more external sensor devices, such as sensors which are attached to the car body or in the interior of the vehicle.

The device also comprises a data communication device in the housing. The data communication device is configured to emit data signals at least relating to an emergency message via a data interface which is arranged in the housing as part of the data communication device. The emergency message comprises at least partially electronic measurement information detected by the one or more sensor devices, and, additionally or alternatively, electronic vehicle state information derived therefrom, for example time-related information on an event. Provision may therefore be made to send the measurement information detected by the sensor device in order to externally evaluate the measurement information. But, it is also possible to at least partially process the detected electronic measurement information in the housing with the aid of the detection device and optionally with the aid of further components such as a control device, to automatically generate an emergency message, for example when threshold values predefined for the electronic measurement data have been exceeded. In the simplest case, the electronic measurement information may comprise merely the message that a collision has occurred.

Further, the device comprises a plug-in device formed on the housing and comprising a plug connector which may be plugged into a vehicle plug-in socket in order to detachably arrange the device on the vehicle. The device for emergency signalling can be removed from the vehicle by simply pulling the plug connector out of the vehicle plug-in socket. An electrical voltage may be supplied via the vehicle plug-in socket from the on-board power system of the vehicle. The vehicle plug-in socket may be formed in the cigarette lighter.

Arranging the plug-in device on the housing may be effected via a piece of cable, the proximal end of which is formed on the housing and the distal end of which is formed on the plug connector. Alternatively, provision may be made for the plug connector to be moulded directly onto the housing. It may be part of the housing, for example in such a way that a section of the housing formed by the plug connector can be plugged into the vehicle socket.

The device for emergency signalling constitutes a mobile device which can be retrofitted without problems in any given vehicle type. Further, the proposed device makes it possible for the user to use it in different vehicles by merely plugging the device into the respective existing vehicle plug-in socket.

With a further development provision is made for the plug connector to comprise at least one electrical plug contact which, when in the plugged-in state, is configured to connect to an electric power supply in the vehicle plug-in socket via an associated socket contact. In this way an electric voltage of the on-board power system of the vehicle available via the vehicle plug-in socket can be utilised for the components and modules of the device for emergency signalling. Provision may be made for the device to be free of its own power supply. Alternatively, a battery device and/or an accumulator device may be provided in the housing, wherein the latter may be chargeable via the power supply from the vehicle plug-in socket. To this end the accumulator device is in electric contact with the at least one electric plug contact.

Provision may be made in one design for the detection device to be connected to one or more sensor devices from the following group of sensor devices: acceleration sensor, speed sensor, rotation rate sensor (gyroscope) and position sensor. The different sensor devices enable various physical variables to be detected which can then be evaluated by the detection device and/or other evaluation modules inside or outside the housing, in order to in particular determine whether threshold values have been exceeded, which, for example, indicate a collision or emergency situation. The sensor devices outside the housing, which may also be called external sensor devices, may be permanently mounted in the vehicle. Alternatively or additionally, sensor devices in a mobile device may be resorted to, such as a position sensor in a mobile telephone. At least the acceleration sensor may be arranged inside the housing of the device. Connection of external sensors may be effected via wireless or wired data links. To this end several plug-in sockets may be provided in the housing in order to establish detachable cable connections to external sensor devices.

The data communication device may be adapted to transmit the data signals via the data interface by means of a wireless near-field data communication to an external communication device arranged in the near-field area. WLAN or Bluetooth technologies are available for data communication in the near-field area. Near-field data communication is suitable to at least transmit the emergency message to the external communications device which may be a mobile telephone for example. The external communication device in turn is then able to transmit the data to a remote network, for example a mobile network or a mobile data network, for example for communicating the data to an emergency centre or service centre. The external communication device is preferably a mobile communication device.

A further development provides for the data interface to comprise a cable connection via which a wired data link can be established to an external communication device and for the data communication device to be configured to transmit the data signals via the data interface to the external communication device by means of wired data communication. With this design transmission of the emergency message is effected via a wired data link to the external communication device, which in turn forwards the received data to an emergency call centre. The cable connection can, for example, be made with the aid of a so-called USB cable, for example for connecting a mobile phone socket and/or a cable connecting plug for connecting the cable.

Provision may be made with one design for the external communication device to be connected, in the connected state, to the electrical power supply in the vehicle plug-in socket. With this embodiment the external communication device such as a mobile telephone is connected via the pluggable device for emergency signalling to the on-board power supply of the vehicle, allowing the external communication device to be supplied with electric voltage. The cable connection may be formed with a cable connecting socket on the housing of the device or at the end of a cable section leading out of the housing. Alternatively, the cable connecting socket may be a cable connector.

A further development may provide for the data communication device to be configured for transmitting the data signals via the data interface to a remote service facility by means of wireless data communication (far-field data communication). The data communication device is, in this case, itself able to communicate the data signals, comprising at least the emergency message and optionally other information, to a remote service facility, for example a data server or any given network communication facility. To this end the data communication device may be equipped with mobile technology to allow the data signals to be communicated via a mobile network. The data communication device may be provided as a radio module, in particular a so-called GSM module (GSM=global systems for mobile communication).

In one design provision may be made for the plug-in device to have an elastic clamping device which is adapted to arrange the plug-in device in vehicle plug-in sockets of various sizes by means of clamping. Pre-tensioned spring contacts may be provided for example, formed symmetrically or asymmetrically with regard to protruding from the housing, which, depending on size and/or shape (e.g. different cross-sectional shapes) of the plug-in socket, spring back to various extents when plugging-in.

With regard to the method for operating the device for emergency signalling in the event of a vehicle collision, the above-described statements apply as appropriate. As such provision may be made to communicate the emergency message initially from the pluggable device to an external communication device with the aid of the data communication device, e.g. to a mobile telephone which then, in turn, forwards the emergency message via the mobile network.

Alternatively, provision may be made for the emergency message to be transmitted directly from the device plugged into the vehicle plug-in socket to the mobile network.

Following receipt of the emergency message at a service centre provision may be made for an automatic call-back, either to the mobile telephone which has transmitted the emergency message, or to a mobile device stored in the service centre, for example in a case where the emergency message was communicated by the plugged-in device for emergency signalling itself.

Provision may also be made to create a log file in the service centre for incoming emergency messages.

When evaluating the electronic measurement information from the sensor devices various algorithms may be utilised which determine criteria in various ways according to the case of application, such that when measurement values are present an emergency message is automatically generated and emitted. In addition, the detection device in the housing of the device may be equipped with sufficient capacity as regards both hardware and software, for example with a microprocessor and associated memory.

Provision may be made for the device to be switched into a sleep mode or standby mode, in which current consumption of the device is minimised or even zero, if during evaluation of the one or more sensor devices by the detection device, the vehicle is found to be in an inactive state. This may involve evaluating one or more acceleration sensors and/or one or more rotation rate sensors, which may be arranged in the housing. The transition into sleep mode and/or standby mode may be communicated to the user visually and/or acoustically with the aid of a signal generator. For example provision may be made for an optical signal generator.

A plausibility check may be performed and the device may be switched into sleep mode or standby mode only if the plausibility check confirms that the vehicle is inactive as determined by the detection device. In addition to sensor evaluation at least one measurable parameter is evaluated which may be used as a criterion for determining an inactive vehicle state. For example the device may comprise a module for wireless remote reading of a device for engine control of the vehicle in order to record information for a plausibility check, such as the operative or non-operative state of the engine.

The plausibility check may comprise at least one of the following steps: determining a drop in operating voltage when an engine of the vehicle is switched off and determining removal of an external communication device to which a data link had previously been established. Also a voltage drop on the vehicle plug socket may be determined In connection with determining the removal of an external communication device the signal strength of the near-field data communication may for example be evaluated. This normally drops when the external communication device such as a mobile telephone is taken out of the vehicle by the user as he/she leaves the vehicle.

Furthermore, a system for emergency signalling from a vehicle with a device for emergency signalling and with an external communication device is provided, which is adapted by means of an application installed in it to emit the emergency message by means of wireless far-field data communication, for example by means of using a data communication in a mobile network to which the external communication device may be operably coupled for data transfer, such as with the aid of a GSM module.

In one embodiment a system for emergency signalling from a vehicle is then provided comprising a mobile device for emergency signalling with a housing; a detection device which is arranged in the housing and adapted to detect electronic measurement information relating to an emergency state of the vehicle from one or more sensor devices formed inside the housing and/or externally; a data communication device which is arranged in the housing and adapted to emit data signals relating to an emergency message/an emergency situation, via a data interface, wherein the data comprises, at least partially, the electronic measurement information and/or electronic vehicle state information derived therefrom; and a plug-in device which is arranged on the housing and comprises a plug connector for plugging into a vehicle plug-in socket. The data communication device is adapted to transmit the data signals via the data interface by means of a wireless near-field communication to an external communication device arranged in the near-field area, which external communication device in turn is adapted by means of an application installed thereon to emit the emergency message by means a wireless far-field data communication. The emergency message generated by the data communication device and transmitted to the external communication device may be a basic message which essentially only comprises the electronic measurement information relating to the emergency state of the vehicle. This measurement information in the basic message may then be evaluated by means of the application in the external communication device in order to generate an extended message which is then transmitted from the external communication device. Alternatively, the electronic information regarding the emergency message may be generated in the device, in order to then transmit it by the external communication device in a changed or in an unchanged form. The message finally emitted by the external communication device may for example comprise a device identification of the external communication device thereby enabling a call-back to be initiated, for example, from a service centre to the external communication device.

In reaction to or following the transmission of the emergency message by the external communication device a voice connection may then be automatically established between the external communication device and an emergency call centre. This may, for example, be initiated by a central server device which has received the emergency message. Or the application installed on the external communication device may instigate a voice connection (automated call) to a number stored in the memory of the external communication device.

The statements made in conjunction with embodiments of the device and/or in conjunction with the method apply to the system as appropriate.

DESCRIPTION OF EMBODIMENTS

Figure 2:
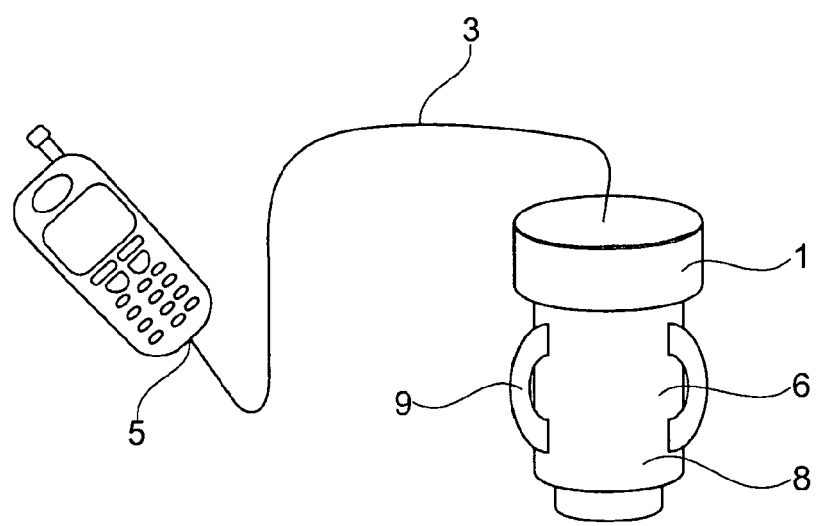
Figure 3:
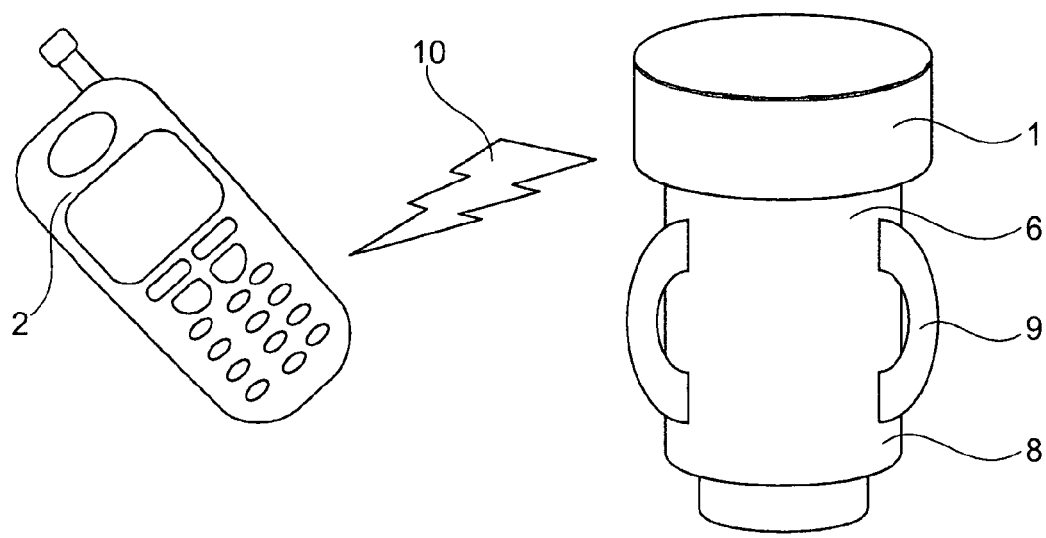
Figure 4:
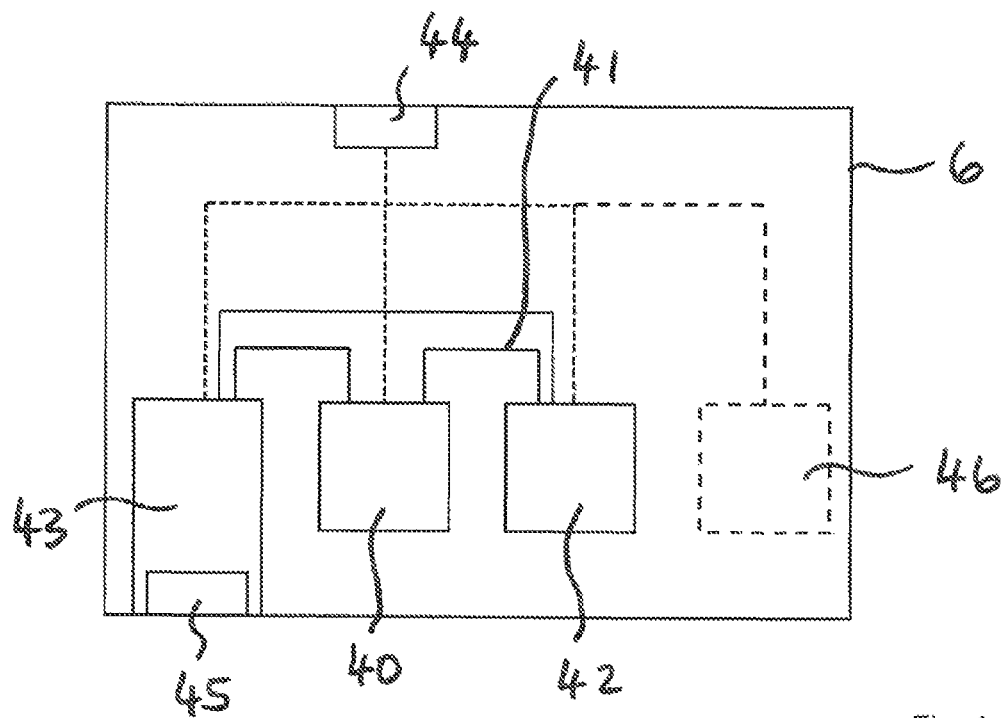
Figure 5:
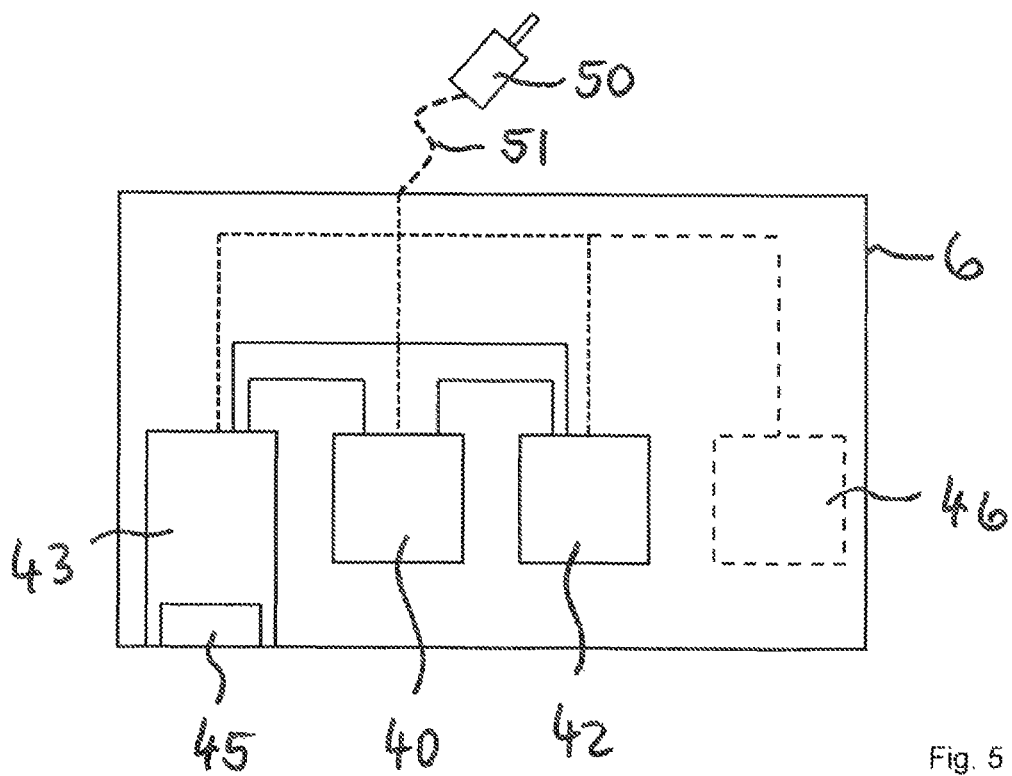
Figure 6:
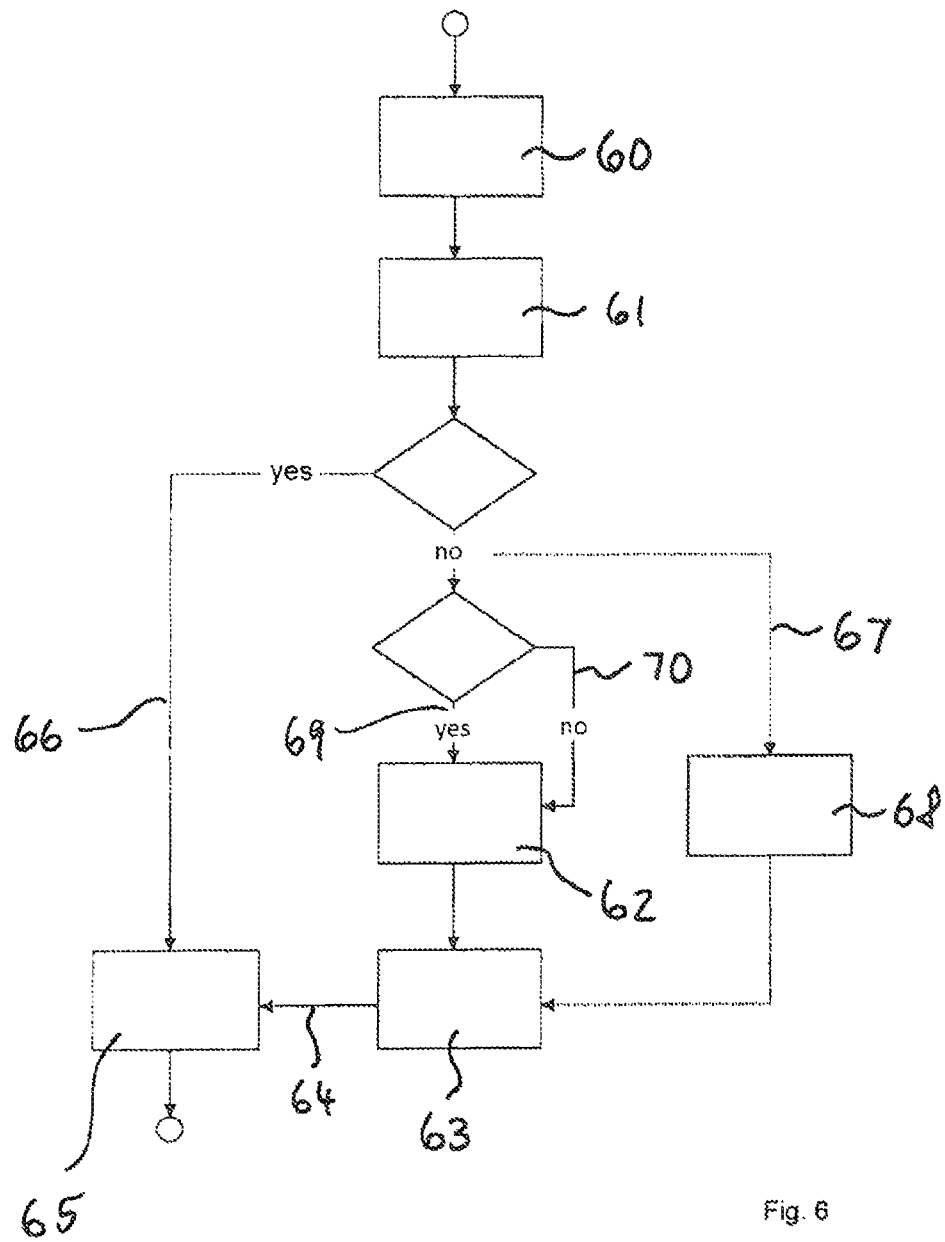

Further embodiments will now be described in detail with reference to the figures of the drawing, in which FIG. 1 shows a schematic diagram of an arrangement with a device for emergency signalling, which is connected via a cable link with a mobile telephone, wherein the cable connection is via a plug-in connection, FIG. 2 shows a schematic diagram of an arrangement with a device for emergency signalling, which is connected via a cable link, wherein the cable leads out from the housing of the pluggable device, FIG. 3 shows a schematic diagram of an arrangement with a pluggable device for emergency signalling and a mobile telephone, which are connected via a wireless data communications link, FIG. 4 shows a schematic block diagram for a device for emergency signalling, FIG. 5 shows a schematic block diagram for a further device for emergency signalling, and FIG. 6 shows a schematic diagram representing the sequence of a collision situation.

FIG. 1 shows a schematic diagram of an arrangement with a device 1 realised as a pluggable component for emergency signalling, for example in the event of a vehicle collision or other vibrations caused by an accident, as well as a mobile telephone 2. The device 1 and the mobile telephone 2 are connected with each other via a cable 3, which for example may be a USB cable connected via a plug-in connection 4 with the device 1. A further plug-in connection 5 is used for connecting the cable 3 with the mobile telephone 2.

The device 1 comprises a housing 6 on which the plug-in connection 4 is formed. In the lower area 7 of the housing 6 a housing section is provided, which forms a plug connector 8 which is adapted to plug into a standardised vehicle plug-in socket (not shown), which for example may be arranged in the cigarette lighter. Furthermore, connection contacts 9 are formed on the housing 6 in the area of the plug connector 8, which in the plugged-in state interact with associated socket contacts in the vehicle plug-in socket such that a connection is established with the electric on-board power supply of the vehicle. This electric power supply may for example be used to supply voltage to the components and modules in the housing 6. Provision may also be made for the electric voltage supply to be provided at the plug-in connection 4 in order to charge the mobile telephone.

The connection contacts 9, with regard to their shaping and/or their respective mechanical pretension, may be adapted so as to shape the housing 6 to suit differently shaped plug-in sockets including socket shapes of asymmetrical construction.

FIG. 2 shows a schematic diagram similar to that in FIG. 1, wherein the cable 3 here is not connected via the plug-in connection 4, but is led out of the housing.

FIG. 3 shows an embodiment in which data transfer between the device 1 and the mobile telephone 3 is not effected via the cable 3, but via a wireless data communications link 10, for example via a near-field data communication such as Bluetooth or WLAN.

In the various embodiments the device 1 and the mobile telephone 2 form a system for emergency signalling.

In the various embodiments provision may be made for the device 1 for emergency signalling to accommodate a radio module such as a GSM module in the housing 6 so that as an alternative to transmitting messages to the mobile telephone 2 the sending and receiving of data signals may be effected directly via a mobile phone network.

FIGS. 4 and 5 show schematic block diagrams of the device 1 for emergency signalling.

With the embodiment shown a detection device 40 is provided in the housing 6, which is connected with a sensor device 42 and a data communication device 43 for exchanging electronic data via data channels 41. Alternatively, the detection device 40 may be connected with sensor devices (not shown) arranged outside the housing 6. It is also possible to provide a combined detection of electronic measurement data from sensor devices arranged both inside the housing 6 and outside the housing 6.

The detection device 40, the sensor device 42 and the data communication device 43 are each electrically connected (broken lines in FIG. 4) with an electric plug contact 44 (see also connection contacts 9 at the top), via which they are connected with the on-board power system of the vehicle provided in order to supply electric voltage to the modules and components.

If threshold values are exceeded during evaluation of the electronic measurement data which in particular comprise acceleration, position and/or speed data indicating a vehicle collision, the detection device 40 generates an emergency message which is communicated via the data link 41 to the data communication device 43, causing it to send the emergency message via a data interface 45 to the mobile telephone 2 for example (see FIGS. 1 to 3), either via a wired or a wireless data communications link. In the case of the embodiment in FIG. 1 the data interface 45 may be connected with the plug-in connection 4.

Alternatively, provision may be made for the detection device 40 not to evaluate the electronic measurement information itself, but to send the information via the data communication device 43 to an external evaluation device (not shown), for example to a mobile telephone, in which data evaluation takes place and where the emergency message is generated, if required.

The housing 6 may have further functional components 46 such as a voltage supply arranged in it.

FIG. 5 shows an embodiment, where a plug connector 50 is connected via a piece of cable 51 to the housing 1. The plug connector 50 serves to plug it into a vehicle plug-in socket and optionally also comprises a contact corresponding to the connection contact 9 for connection to the on-board power system.

FIG. 6 shows a schematic diagram depicting a possible sequence for emergency signalling in the event of a collision. If a collision (accident) 60 takes place, the device 1 for emergency signalling generates an emergency message in step 61 which is then sent by the device 1 itself or via the mobile telephone 2. To this end a connection to a service centre 62 is established. If the mobile telephone 2 is involved in the process, receiving and forwarding the emergency message is handled in the phone with the aid of an application installed on the mobile telephone 2.

The service centre 62 can then initiate processes or measures in a step 63, such as informing a rescue service. In step 64 provision may be made for storing information about the emergency message in a log file 65, in particular on completion of the emergency call. Should it be decided during the emergency call to abort the same, the log file entry may still be made without involving the service centre 62, in step 66. If the emergency call is continued, emergency measures may be initiated via a secure network 68, in step 67.

The connection with the service centre 62 may be made in step 69 immediately or in step 70 with a time delay.

The features of the invention disclosed in the above description, the claims and the drawing may be of importance both individually and in any given combination for realising the invention in its various embodiments.

The invention claimed is:

1. A device for emergency signalling from a vehicle, comprising:
   a housing,
   a detection device, which is arranged in the housing and adapted to detect electronic measurement information regarding an emergency state of the vehicle from one or more sensor devices, wherein the one or more sensor devices are formed in the housing, externally, or both,
   a data communication device which is arranged in the housing and adapted to emit data signals regarding an emergency message via a data interface, wherein the emergency message comprises at least partially the electronic measurement information, electronic vehicle state information derived therefrom, or both, and a plug-in device which is arranged on the housing and comprises a plug connector for plugging into a vehicle plug-in socket, wherein the device is adapted to conduct a plausibility check, wherein the device is switched into a sleep mode or a standby mode only if the plausibility check confirms an inactive state of the vehicle determined using the detection device, wherein the sleep mode or the standby mode minimizes or reduces to zero a current consumption of the device.

2. The device according to claim 1, wherein the plug connector comprises at least one electric plug-in contact which is configured, when in the plugged-in state, to connect to an electric power supply in the vehicle plug-in socket via an associated socket contact.

3. The device according to claim 2, wherein the at least one electric plug contact is electrically connected with the cable connection such that the external communication device, in the connected state, is connected via the cable connection to the electric power supply in the vehicle plug-in socket.

4. The device according to claim 1, wherein the detection device connects to one or more sensor devices from the following group of sensor devices: acceleration sensor, rotation rate sensor (gyroscope), speed sensor and position sensor.

5. The device according to claim 1, wherein the data communication device is adapted to transmit the data signals via the data interface by means of a wireless near-field data communication to an external communication device arranged in a near-field area.

6. The device according to claim 1, wherein the data interface comprises a cable connection, via which a wired data link to an external communication device can be established, and wherein the data communication device is adapted to transmit the data signals via the data interface by means of a wired data communication to the external communication device.

7. The device according to claim 6, wherein the at least one electric plug contact is electrically connected with the cable connection such that the external communication device, in the connected state, is connected via the cable connection to an electric power supply in the vehicle plug-in socket.

8. The device according to claim 1, wherein the data communication device is adapted to transmit the data signals via the data interface by a wireless data communication to a remote service facility.

9. The device according to claim 1, wherein the plug-in device comprises an elastic clamping device with a compensating mechanism which is adapted to arrange the plug connector in vehicle plug-in sockets of different sizes by means of clamping.

10. The device according to claim 1, wherein the plausibility check comprises at least one of the following steps:
  determining a drop in operating voltage when switching-off an engine of the vehicle, and
  determining a removal of an external communication device to which a data link had been previously established.

11. A system for emergency signalling from a vehicle, comprising
  a housing,
  a detection device, which is arranged in the housing and adapted to detect electronic measurement information regarding an emergency state of the vehicle from one or more sensor devices, wherein the one or more sensor devices are formed in the housing, externally, or both,
  a data communication device which is arranged in the housing and adapted to emit data signals regarding an emergency message via a data interface, wherein the emergency message comprises at least partially the electronic measurement information, electronic vehicle state information derived therefrom, or both,
  a plug-in device which is arranged on the housing and comprises a plug connector for plugging into a vehicle plug-in socket; and
  an external communication device, which is adapted by means of an application installed thereon to emit the emergency message by means of a wireless far-field data communication,
  wherein the system is adapted to conduct a plausibility check,
  wherein the system is switched into a sleep mode or a standby mode only if the plausibility check confirms an inactive state of the vehicle determined using the detection device,
  wherein the sleep mode or the standby mode minimizes or reduces to zero a current consumption of the device.

12. The system according to claim 11, wherein the plausibility check comprises at least one of the following steps:
  determining a drop in operating voltage when switching-off an engine of the vehicle, and
  determining a removal of the external communication device to which a data link had been previously established.

13. A method for operating a device for emergency signalling from a vehicle, wherein the method comprises the following steps:
  providing a device for emergency signalling, which comprises a housing, a detection device and a data communication device, which are arranged in the housing, as well as a plug-in device which is arranged on the housing and formed with a plug connector,
  arranging the device for emergency signalling in a vehicle by plugging the plug connector into a vehicle plug-in socket of the vehicle,
  detecting, by the detection device, electronic measurement information relating to an emergency state of the vehicle from one or more sensor devices formed in the housing or externally, and
  sending data signals relating to an emergency message via a data interface of the data communication device, wherein the emergency message comprises at least partially the electronic measurement information, electronic vehicle state information derived therefrom, or both,
  wherein the device is adapted to conduct a plausibility check,
  wherein the device is switched into a sleep mode or a standby mode only if the plausibility check confirms an inactive state of the vehicle determined using the detection device,
  wherein the sleep mode or the standby mode minimizes or reduces to zero a current consumption of the device.

14. The method according to claim 13, wherein the plausibility check comprises at least one of the following steps:
  determining a drop in operating voltage when switching-off an engine of the vehicle, and
  determining a removal of an external communication device to which a data link had been previously established.

* * * * *